FIG. I

INVENTORS
GEORGE B. FOSTER
KENNETH A. OSTRANDER
BY
*LeBlanc and Shur*
ATTORNEYS

United States Patent Office 3,353,098
Patented Nov. 14, 1967

3,353,098
TRANSDUCER SYSTEM HAVING A VARIABLE CHARACTERISTIC DISCRIMINATOR
George B. Foster, Worthington, and Kenneth A. Ostrander, Columbus, Ohio, assignors, by mesne assignments, to The Reliance Electric and Engineering Company, Cleveland, Ohio, a corporation of Ohio
Filed May 7, 1963, Ser. No. 278,664
10 Claims. (Cl. 325—45)

This invention relates to a non-contacting vibration or position transducing system and, more particularly, relates to an improved converter for converting the signals from the transducer into a calibrated indicating signal for actuating an indicator or analyzer of the characteristic under observation.

In the assignee's copending application of George B. Foster, Ser. No. 36,662, now Patent No. 3,180,136, filed June 16, 1960, there is disclosed a novel, non-contact transducing system for transducing vibration or position or contour of an object wherein, in one embodiment, the transducer comprises a capacitance probe which is sensitive to the spacing between the probe and the object under observation to produce a frequency modulated signal which may be constantly standardized or calibrated in a novel manner to permit the detection of a signal which is an accurate function of the vibration or spacing to be determined. It was a feature of that prior system that automatic frequency control was provided in the converter circuit in order to permit operation of the system within a reasonable range of spacing between the transducer and the object under study and also to permit hand carrying of the transducer during measurement in certain instances.

However, it was found that in certain instances the automatic frequency control system seemed to lose control and it was necessary to relocate the spacing in which control was regained by trial and error spacing. After considerable experimentation it was found that such loss of control did not occur when the probe was moved slowly but only upon rapid movement. Further study indicated that the cause of this phenomenon was that rapid movement caused a shift in the modulating frequency at a rate which the time responsive circuits in the automatic frequency control system could not follow. While it might appear that a solution could be had by simply reducing the appropriate time constants in the automatic frequency control circuits, this was not desirable as these time constants were deliberately made high in order to prevent the automatic frequency control system from cancelling the effect of the vibration or other phenomena under stduy. Another possible solution which suggested itself was the use of a very wide deviation discriminator characteristic to prevent slow response in the automatic frequency control circuit from carrying the frequency of the modulation signal beyond the deviation limits of the discriminator. However, this solution also proved to be more apparent than real in that it prohibitively reduced the sensitivity of the system. That is to say, if the system was made operative over a very large variation of spacing through a very large deviation capacity in the discriminator characteristic, the slope of the characteristic was small and sensitivity became undesirably low. On the other extreme, if the slope of the discriminator characteristic was made optimally steep, it took relatively small rapid movement of the transducer to cause a deviation beyond the range of the discriminator characteristic, thereby leaving the operator without any indication as to whether the pick-up was too close or too far and with the necessity of empirically determining the proper placement.

According to the present invention, it has now been found that these difficulties may be overcome through the provision of a discriminator means which provides at the same time a discriminator characteristic having a high deviation range but with an optimally steep slope of the characteristic at the center thereof, within the normal range of vibration or other spacing to be observed. The new system thus extends the range of deviation of the discriminator characteristic without destroying its desirable high sensitivity and without requiring any departure from optimum time constants in the automatic frequency control circuit. Thus, the system does not become inoperative when the transducer is spaced from the object to be observed by a distance which would produce a signal falling outside of the optimum slope discriminator measurement range but rather provides a signal to the operator to indicate whether the transducer is too close or too far from the object under observation. In addition, the system permits the use of an optimum time constant in the critical RC circuit in the automatic frequency control system but provides an automatic wide deviation discriminator override to permit immediate reaction to frequency shifts too rapid for the RC circuit to follow. This arrangement overcomes the difficulty previously encountered with too rapid movement of the transducer while at the same time retaining optimum time constants in the automatic frequency control system for operation within the measuring range of the system.

It is, accordingly, a primary object of the present invention to provide an improved non-contact vibration or other variable transducer system.

It is another object of the invention to provide an improved conversion system for a non-contact transducer using a frequency modulated carrier.

It is another object of the invention to provide an improved capacitive type transducing system with high sensitivity in the measuring range which also provides an information imparting response at a lower sensitivity when the transducer is so moved as to carry the transduced signal beyond the measuring range.

It is another object of the invention to provide an improved non-contact capacitive type transducer system having an automatic frequency control device designed for optimum time response within the measuring range but also having an override circuit which provides more rapid time response when the rate of response of the normal automatic frequency control circuit is exceeded.

It is still another object of the invention to provide an improved non-contact transducer system of the capacitive or other type wherein the information to be transduced is contained in the form of a frequency modulated carrier.

It is a further object of the invention to provide an improved non-contact transducer system which permits a wider effective efficient range of placement of the transducer relative to the object under study.

It is another object of the invention to provide an improved non-contact transducer system which provides the operator with an indication of when the transducer is too close or too far respectively from the object to be observed.

These and further objects and advantages of the invention will become more apparent upon reference to the following specification, claims and drawings wherein:

Figure 1:
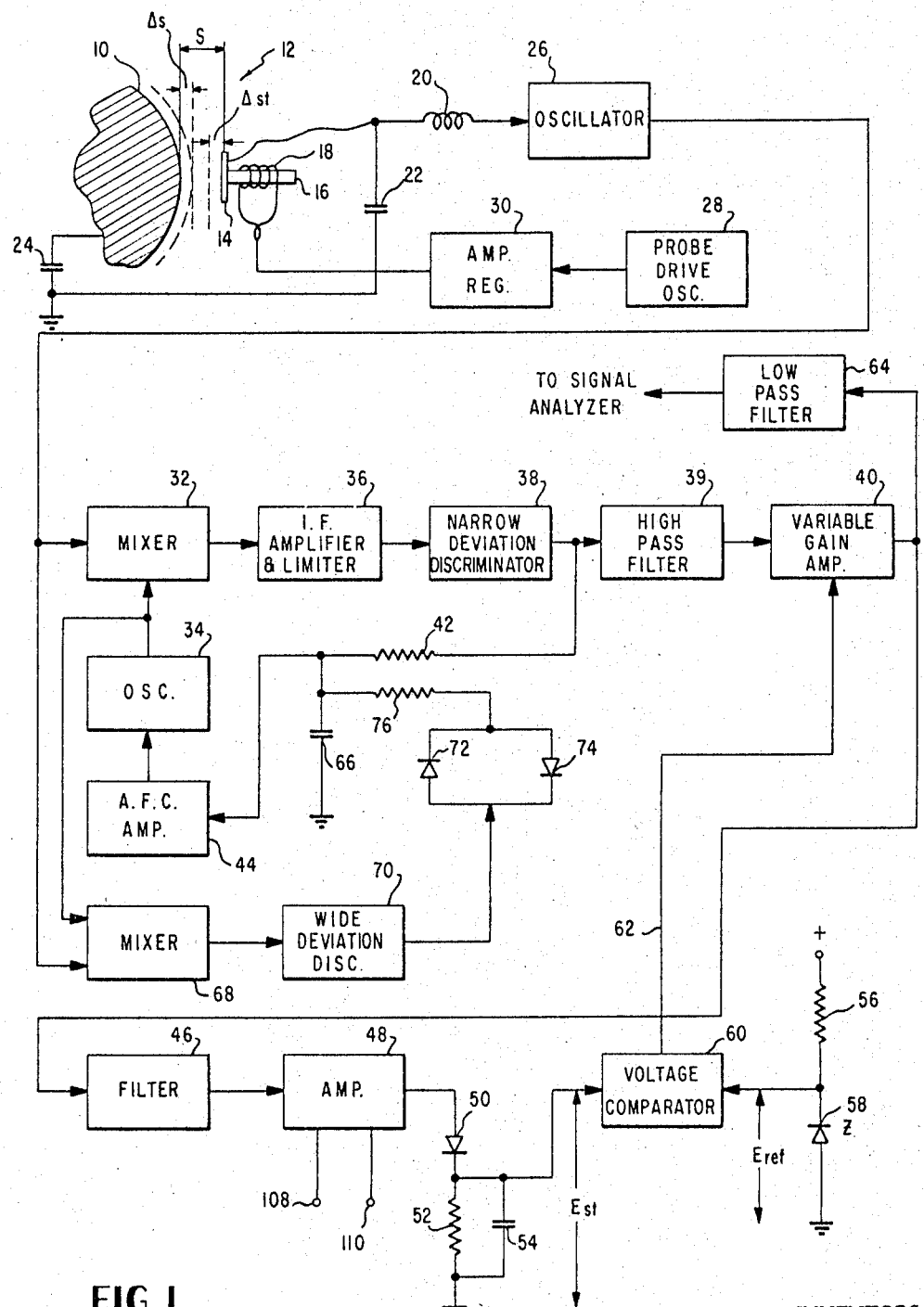
FIGURE 1 is a block diagram of a non-contact capacitive type transducer system constructed according to the invention.

Referring more particularly to FIGURE 1, there is shown an object 10 of circular configuration which may be adapted to rotate and whose vibration or eccentricity it may be desired to measure or analyze. A capacitive type transducer generally indicated at 12 is disposed adjacent the object 10 and consists of a capacitor plate 14 affixed to the armature 16 of a solenoid 18. The plate 14 is connected to an inductance 20 and to a grounded capacitor 22. The object or workpiece under study 10 exhibits a capacitance to ground indicated by the capacitor 24. The tuned circuit which is formed by the inductance 20 and capacitors 22 and 24 and the capacitance between the plate 14 and workpiece 10 are utilized as the frequency determining circuit in an oscillator 26.

When the object or workpiece 10 vibrates or moves due to eccentricity, the distance S between the workpiece and the plate 14 varies by an amount $\Delta_s$ and this changes the value of the capacitance in the frequency determining circuit of the oscillator 26 and causes the frequency of oscillation to vary accordingly. The circuit constants of the inductance 20 and capacitors associated therewith are so chosen that the frequency of oscillation of the oscillator is preferably in the radio frequency range. The variation in frequency of the output of the oscillator 26 in response to relative displacement between the plate 14 and workpiece 10 produces a frequency modulated carrier. The magnitude of change in generated oscillator frequency (deviation) is determined by the magnitude of the relative movement between the plate 14 and workpiece 10, while the rapidity with which the carrier frequency shifts between these limits is determined by the frequency of the relative motion between these same two elements.

The plate 14, carried by the armature 16, is caused to vibrate by the solenoid 18 which is driven by a probe drive oscillator 28 which feeds its signal through an amplitude regulator 30. The amplitude regulator is provided to insure a constant vibration amplitude of the plate 14 of the probe. This vibration of the probe plate 14 causes a variation in the frequency of the carrier oscillator 26 with the magnitude of the change in carrier frequency being a function of the magnitude of the vibration, and the frequency of change being controlled by the frequency of the signal from the probe drive oscillator 28 and amplitude regulator 30.

The frequency modulated output of the carrier oscillator 26 is fed to a mixer 32 which receives a beat signal from a beat or local oscillator 34. The output of the mixer 32 constitutes an intermediate frequency or I.F. signal which is fed to an I.F. amplifier and limiter 36 and a frequency modulation detector or discriminator 38. The output of the FM detector or discriminator 38 is fed to a high pass filter 39 designed to pass signals having a frequency higher than about 15 c.p.s. The output of narrow deviation discriminator 38 is also then fed to an amplifier 40 having a controllable gain characteristic and is also fed through a resistor 42 to an automatic frequency control amplifier 44. The automatic frequency control amplifier 44 feeds an input to the beat or local oscillator 34 to determine its frequency of oscillation in the conventional manner of an automatic frequency control system.

The output of the controllable gain amplifier 40 is fed to a selective filter 46 which is tuned to the frequency of vibration of the probe drive oscillator 28. The output of the filter 46 is fed through an amplifier 48 to a rectifying device 50 and load resistor 52 which is shunted by a capacitor 54 to produce a comparison voltage $E_{st}$. A reference voltage $E_{ref}$ is created by a positive supply voltage fed to a resistor 56 and zener diode 58. A voltage comparator 60 compares the reference voltage $E_{ref}$ with the comparison voltage $E_{st}$ and feeds an error signal on the line 62 to the variable gain amplifier 40 to control the gain thereof in order to maintain an equality between these two voltages and therefore continually insure accurate calibration of the system.

The output of the variable gain amplifier 40, in addition to being fed to the selective filter 46, is also fed to a low pass filter 64 and thence to a vibration signal analyzer or other indicating device and this constitutes the desired output of the system.

The operation of the system thus far described is as follows: The vibration of the probe plate 14 under the influence of the probe drive oscillator 28 causes frequency modulation of the signal of the oscillator 26 at a frequency $f_{st}$. If the workpiece 10 now vibrates through a displacement $\Delta_s$, the frequency modulation signal caused by vibration of the probe plate 14 is superimposed on the frequency modulation caused by the displacement $\Delta_{st}$. The complex frequency modulated signal is fed to the mixer 32. The beat or local oscillator 34 preferably operates at a radio frequency which produces an intermediate frequency signal which is also at a radio frequency. As one example, the oscillator 26 may have a center frequency of five megacycles while the beat or local oscillator 34 may operate at a center frequency of fifteen megacycles to produce an intermediate frequency signal of 10 megacycles. Where vibration is under study, it generally is at a frequency in the audio range and the frequency of the probe drive oscillator 28 is also in this range but higher than the highest vibration frequency likely to be encountered.

The FM detector or discriminator 38 produces complex audio frequency signals which are fed to the low pass filter 39, to variable gain amplifier 40 and thence to the filters 46 and 64. The selective filter 46 selectively passes the calibration signal at the frequency $f_{st}$ created by the vibration of the probe plate 14 and this is utilized to control the gain of the amplifier 40 to obtain constant and continuous calibration. The low pass filter 64 segregates the vibration signal or signals which are created by the vibration of the workpiece from the calibration signal and the vibration signals are fed through any suitable vibration signal analyzer or to any other suitable type of analyzer where measurements other than vibration measurements are being made. The cut-off frequency of the low pass filter 64 is higher than the maximum vibration signal under study, but lower than the frequency of the probe drive oscillator 28. The high pass filter 39 is included between the discriminator 38 and variable gain amplifier 40 to minimize the possibility of saturating the following stages when the transducer or probe 12 is hand held.

The automatic frequency control signal from the FM detector or discriminator 38 appears across a voltage divider capacitor 66 at the input of the automatic frequency control amplifier 44. The time constant of the capacitor 66 and resistor 42 is made relatively high; as an example, it may be on the order of 150 seconds, and this prevents the automatic frequency control amplifier 44 from responding to frequency shifts at the vibration frequency which it is desired to measure. The FM detector or discriminator 38 is provided with an optimum characteristic over the frequency range corresponding to the maximum vibration or other parameter $\Delta_s$ under study. As an example, the discriminator 38 may provide a voltage change of approximately 17 volts in response to a frequency change of eight kilocycles.

As explained, where there is a shift in frequency beyond this eight kilocycle range, the system is no longer responsive. Also, where there is a shift in frequency at a rate too rapid for the RC combination 42–66 to follow, the automatic frequency control system cannot maintain the I.F. frequency constant with either a resulting deterioration of the accuracy of the system or a loss of control of the frequency of the I.F. signal. In order to cure these deficiencies there are provided a second mixer 68 which receives inputs from the main oscillator 26 and from the beat or local oscillator 34. The output of the second mixer 68 is fed to a second FM detector or discriminator 70 which has its output connected to a pair of reversely connected diodes 72 and 74 which are connected through a resistor 76 to the capacitor 66. The deviation characteristic of the second FM detector or discriminator 70 is much wider than that of the first discriminator 38 and may, for instance, provide a voltage change of ten volts in response to a frequency change of 500 kilocycles. The characteristic of this discriminator thus has a much lower slope than the characteristic of the narrow deviation discriminator 38.

The operation of this section of the system is as follows: When the range and rate of frequency change being handled by the RC combination 42–66 and automatic frequency control amplifier 44 is within the range of the narrow discriminator 38 and occurs at a rate which the RC combination 42–66 can follow, the voltage drop across the diodes 72–74 is so small that the diodes, in effect, constitute an open circuit. At such a time the discriminator 38 and automatic frequency control system maintain the frequency of the I.F. signal at a proper value. However, when there is a rapid change in frequency which the capacitor 66 is unable to follow or there is a change in frequency beyond the range of the narrow discriminator 38, the voltage across the diodes 72–74 becomes high enough to render the diodes conducting and rapidly charge the capacitor 66 through the resistor 76, the time constant of the resistor 76 and capacitor 66 being relatively low to permit this action. This brings the signal from the first mixer 32 back to the center frequency of the I.F. amplifier and limiter 36 and back to the center of the characteristic of the narrow deviation discriminator 38 which then again takes over control whereupon the diodes 72 and 74 again act as an open circuit. As a result, the circuit eliminates the previous difficulty which was encountered when the probe was moved too fast for the normal discriminator circuit to accommodate.

Figure 2:
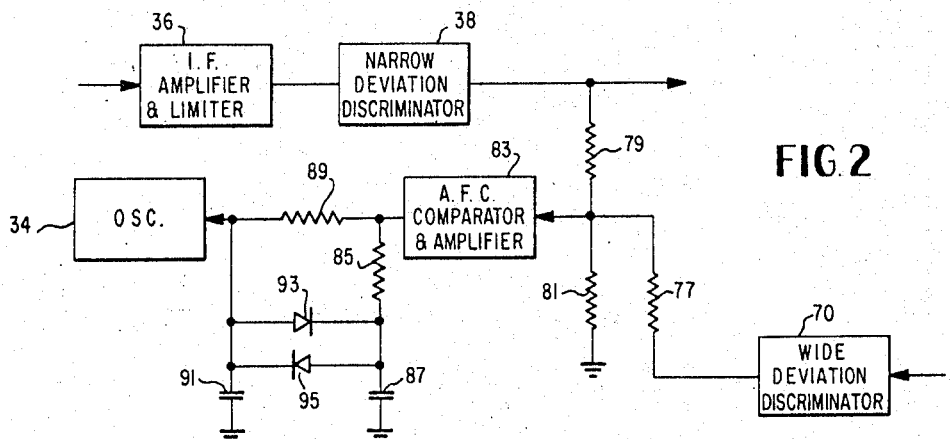
FIGURE 2 is a block diagram of a modification of the system of FIGURE 1.

A second embodiment of combined narrow deviation and wide deviation discriminators is shown in FIGURE 2. In this embodiment the system is identical to that shown in FIGURE 1, with the exception of the indicated changes, and therefore the same reference numerals are used on common elements. Referring to FIGURE 2, the outputs of the wide deviation discriminator 70 and narrow deviation discriminator 38 are combined in the resistor network 77, 79 and 81 and fed to an automatic frequency control comparator and amplifier 83. The comparator compares the input signal on resistor 81 to a fixed level, such as, for example, −12 volts, and the difference signal is amplified by the amplifier. This signal is then fed to a pair of integrators 85–87 and 89–91, the capacitors 87 and 91 being coupled by a pair of diodes 93 and 95. The time constant of the integrator 89–91 is relatively long while that of the integrator 85–87 is relatively short. The output of integrator 89–91 is connected to the oscillator 34.

The operation of this system is substantially the same as that of the system illustrated in FIGURE 1. That is to say, the integrator 89–91 is controlling, except when a fast frequency shift causes the diodes to open up. Thus the long time constant of integrator 89–91 serves to hold the discriminator output in the center of the dead zone established by the diode coupled integrator. In both this embodiment and that of FIGURE 1 the dynamics of the overall system is not affected by the automatic frequency control.

While the foregoing arrangements permit the automatic frequency control system to maintain the proper I.F. frequency over a relatively wide spacing between the transducer and object under observation, even where the relative movement between the transducer and observed object is quite rapid, it is still desirable to have the operator maintain the transducer within a certain preferred range of distance from the observed object in order to obtain optimum operation of the system. Thus, when the transducer is too far from the observed object, the variable gain amplifier 40 operates at maximum gain and ultimately cannot provide adequate gain to accurately calibrate the system. Also, the signal to noise ratio deteriorates with an adverse effect upon the operation of the system. Where the transducer is too close to the observed object, the variable gain amplifier 40 operates at minimum gain and again may be incapable of providing accurate calibration.

Figure 3:
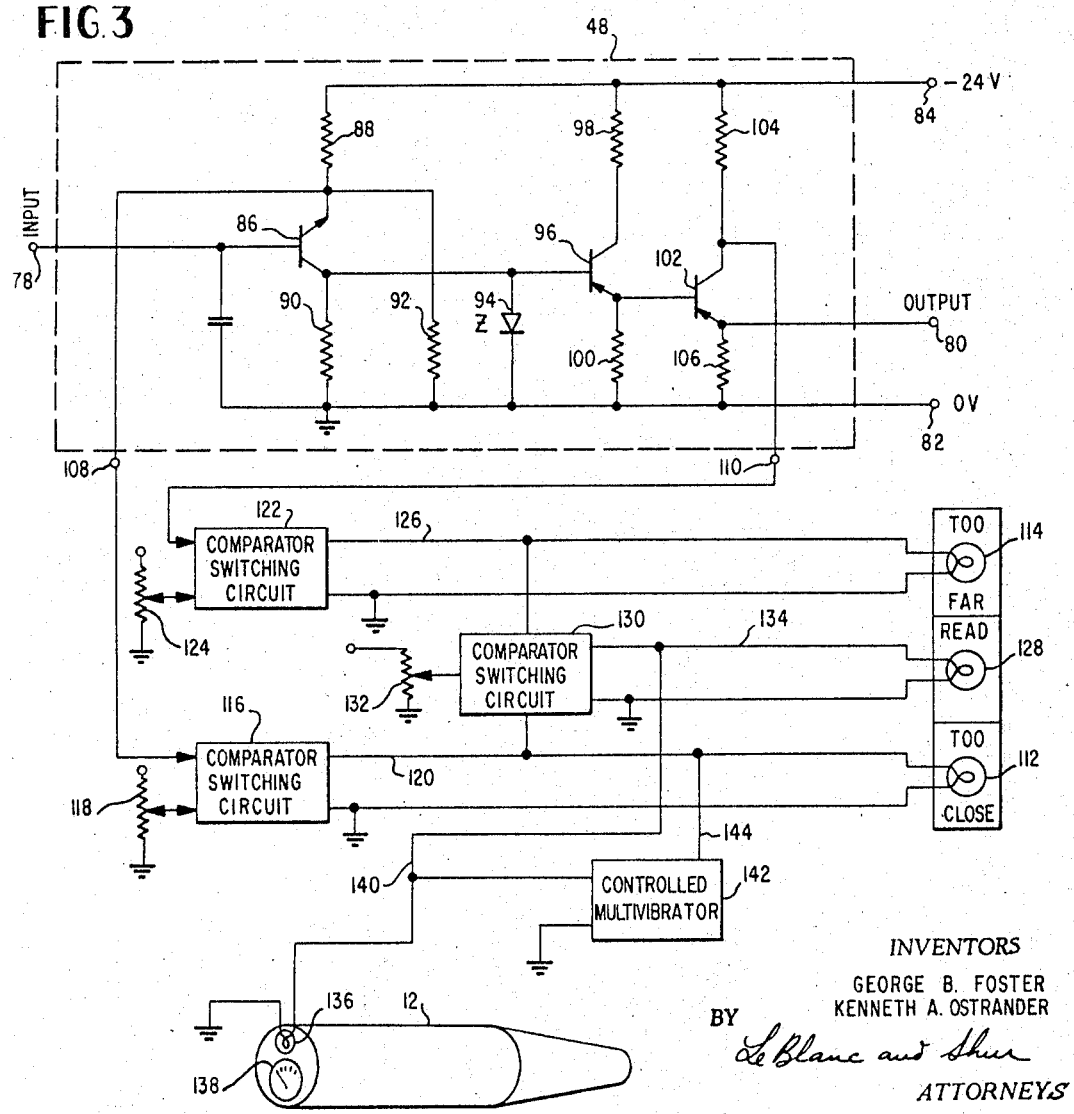
FIGURE 3 is a diagram showing the portion of the system for indicating when the transducer is too close to and too far from the object under study.

In order to eliminate these difficulties, the system of the invention incorporates an indicating apparatus which is illustrated in FIGURE 3. Referring to that figure, there is shown in the block 48 a portion of the amplifier 48 in FIGURE 1 with the input to this portion of the amplifier being indicated at 78 and the output at 80. Voltage supply to the transistors is provided at the terminals 82 and 84. The input 78 is connected to the base of an NPN transistor 86 having its emitter connected through the resistor 88 to the voltage supply terminal 84. The collector of the transistor 86 is, in turn, grounded through a resistor 90. A resistor 92 is connected across the emitter and collector and the output from this stage is connected across a zener diode 94 to the base of a PNP transistor 96. The transistor 96 has a resistor 98 connected between the voltage supply terminal 84 and its collector and a resistor 100 connected between its emitter and ground. The output is taken from the emitter to the base of a second PNP transistor 102 having resistors 104 and 106 in its collector and emitter circuits respectively. Output is taken from the emitter across resistor 106 at output terminal 80. The amplifying action of the transistors is conventional.

Indicator control voltages are taken from the unit 48 at terminal 108 which is connected to the emitter of transistor 86, and at terminal 110 which is connected to the collector of transistor 102. The terminal 108 provides a control voltage for actuating a "too close" indicator lamp 112, while the voltage at terminal 110 controls the actuation of a "too far" indicator lamp 114. As the transducer moves closer and closer to the observed object and finally reaches the "too close" range, the current flowing through transistor 86 increases until the zener diode 94 limits a further increase in voltage across resistor 90 and the potential at the emitter of transistor 86 drops from a normal value on the order of 23 volts to approximately 10 volts. Conversely, as the transducer is moved farther and farther away from the observed object, the current flow through the transistor 102 decreases so that the voltage at its collector, which is ordinarily on the order of 12 volts, approaches the 24 volt supply voltage.

The terminal 108 which provides the "too close" indication is connected to a suitable comparator switching circuit 116 which compares the voltage on terminal 108 to an adjustable voltage fed into the comparator from the potentiometer 118. Any suitable voltage comparator circuit may be utilized, such as a simple transistor switching circuit with the reference voltage 118 acting as an adjustable bias. Such a circuit is disclosed, for instance, in "Basic Theory and Application of Transistors," TM 11–690, Department of the Army, 1959. Assuming that the comparator switching circuit 116 has its reference voltage 118 adjusted so that switching occurs when the voltage at terminal 108 drops to around 10 volts, an independent voltage supply circuit 120 connected to the indicator lamp 112 is closed by the comparator switching circuit to energize the "too close" lamp 112. The "too far" terminal 110 is connected to a similar comparator switching circuit 122 which is provided with a reference voltage from a potentiometer 124 and which controls a bulb actuating supply circuit 126. Here the reference voltage provided at 124 may be set so that when the voltage on terminal 110 goes as high as 23 volts, the energizing circuit 126 for the "too far" lamp 114 is energized to illuminate that lamp.

A third signal lamp, indicated as the "read" signal lamp at 128, is supplied with power by a third comparator switching circuit 130 which compares the voltages in the circuits 120 and 126 with a reference voltage obtained from a potentiometer 132. This comparator switching circuit is so arranged that if either the circuits 120 or 126 are energized, the supply circuit 134 to the lamp 128 is de-energized. If either of the circuits 120 or 126 are energized, the comparator switching circuit 130 then energizes the supply circuit 134 to illuminate the lamp 128 to indicate to the operator that the transducer is in a proper position to read the vibration or other parameter being observed. The lamps 112, 114 and 128 may be provided on the cabinet for the converter which ordinarily will be viewable as the transducer is brought into proximity to the object under observation.

In order to provide further convenience for the operator in determining when the transducer is in the proper operating position, the transducer which is generally indicated at 12 may itself be provided with an indicator lamp 136. Where desired, the transducer may also be provided with an amplitude meter 138 which duplicates the reading of the amplitude meter in the vibration analyzer which is connected to the converter system of this invention. The lamp 136 in the transducer 12 has one terminal thereof grounded and has the other terminal conducted through connector 140 to the supply circuit 134 for the "read" lamp 128. Thus, when the read lamp 128 is illuminated, the lamp 136 on the transducer itself glows steadily to indicate to the operator that he is in a proper position to observe the desired indication from the signal analyzer or from the meter 138 on the transducer itself. A self-starting multi-vibrator 142 is switched on and off by the application of a voltage on the line 144 connected to the "too close" circuit 120, and has its output connected to the lamp 136 in the transducer 12.

The effect of this arrangement is that when the transducer 12 is too close to the object under observation, the "too close" lamp 112 is illuminated and the multi-vibrator 142 is caused to provide an intermittent signal on the line 140 to the lamp 136 on the transducer itself so that the operator sees a blinking signal at this point. This indicates that the transducer is too close and so the operator moves it farther away. When the transducer arrives in the acceptable spacing range, the "too close" supply circuit 120 is de-energized, the multi-vibrator 142 is turned off, and at the same time the "read" circuit 134 is energized to energize both the "read" lamp 128 and the lamp 136. Thus, by observing either the "read" lamp or the steadily illuminated lamp 136, the operator knows that the transducer is in the proper operating range. If the transducer is moved farther away, the "too far" supply circuit 126 is energized to illuminate the "too far" lamp 114. This also de-energizes the "read" lamp energizing circuit 134 thereby extinguishing both the "read" lamp 128 and the lamp 136 on the transducer so that the operator may know that the transducer is too far from observation of either lamp.

As a result, there are two independent signalling systems which the operator may observe in properly positioning the transducer. He may refer to the "too far," "read," and "too close" lamps 114, 128 and 112 respectively on the converter housing, or he may refer to the lamp 136 on the transducer itself. When the transducer is too far, the lamp 136 is extinguished. When the transducer is in the proper range, the lamp 136 is continuously illuminated. When the transducer is too close, the lamp 136 intermittently flashes on and off.

It will be apparent from the foregoing that with the non-contact transducer of this invention, there is provided a converter system which provides high sensitivity when the transducer is in the preferred spacing range from the object under observation, but which also provides a prompt reaction to a movement of the transducer outside of this range where that transducer movement is a rapid one. It will also be apparent that the device of the invention provides an indicating system for indicating at either one or a plurality of positions, the proper positioning of the transducer with respect to the object under observation. As a result, the accuracy of the system is made less dependent upon the skill of the operator and the convenience of using the system and the rapidity with which accurate measurements may be made are greatly enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A non-contact system for transducing a variable to be measured including portable pickup means adapted to be hand held by a user in operative position relative to a source of said variable, means connected to said hand held pickup means for producing a carrier frequency modulated in response to variations in said variable, said carrier frequency experiencing substantial and rapid variations during operation due to movement of the pickup means in the hands of the user, beat oscillator means, mixer means for mixing said frequency modulated carrier and the signal from said beat oscillator to provide an I.F. signal, discriminator means for detecting said I.F. signal, and automatic frequency control means for maintaining said I.F. signal at a constant frequency, said automatic frequency control means being responsive to a signal from said discriminator means, said discriminator means having an overall discriminator characteristic having a high slope over the range of deviation normally caused by the variation of said variable and a lower slope over a larger deviation range which is considerably greater than the high slope deviation range.

2. A non-contact system as set out in claim 1 wherein the lower slope deviation range is many times the high slope deviation range.

3. A non-contact system as set out in claim 1 wherein the lower slope deviation range is at least 50 times the high slope deviation range.

4. A non-contact system as set out in claim 1 wherein said automatic frequency control means is responsive to a signal from said discriminator means, and said discriminator means has an overall discriminator characteristic having a relatively low slope over its major portion and a high slope at the center thereof.

5. A non-contact system as set out in claim 1 wherein said automatic frequency control means is operative in response to a signal from said discriminator means, said automatic frequency control means having a maximum response speed, and second discriminator means responsive to said frequency modulated signal and connected to said automatic frequency control means for maintaining the frequency of said I.F. signal constant at a response speed in excess of said maximum response speed.

6. A non-contact system as set out in claim 1 wherein said automatic frequency control means is responsive to a signal from said discriminator means so long as the frequency excursion occurs at the rate less than the maximum response rate of said automatic frequency control means, and means for substantially immediately returning the frequency of said I.F. signal within the deviation range of said discriminator means when the frequency excursion exceeds the maximum response rate of said automatic frequency control means.

7. A non-contact system as set out in claim 6 wherein said last named means comprises a second discriminator means having a larger deviation range and a substantially lesser slope within said deviation range than said first named discriminator means.

8. A non-contact system as set out in claim 1 wherein said automatic frequency control means is responsive to a signal produced across a capacitor in a series RC circuit connected across the output of said discriminator, said RC circuit having a time constant too high to permit the voltage across said capacitor to follow the signal changes caused by the variation in said variable to be measured, further discriminator means responsive to said frequency modulated signal, and means for connecting the output of said further discriminator means to said capacitor when the signal through said RC circuit occurs at a rate too high to permit the voltage across said capacitor to follow.

9. A non-contact system as set out in claim 8 wherein said last named means connects said further discriminator means to said capacitor through a resistance means which, with said capacitor, has a much smaller time constant than said RC time constant.

10. A non-contact system as set out in claim 9 wherein said resistance means comprises a resistor in series with paralleled reversely connected rectifying devices.

References Cited

UNITED STATES PATENTS

| | | | |
|---|---|---|---|
| 2,270,023 | 1/1942 | Ramsay et al. | 331—11 X |
| 2,410,817 | 11/1946 | Ginzton et al. | 331—11 |
| 2,558,100 | 6/1951 | Rambo | 331—11 |
| 2,838,673 | 6/1958 | Fernsler et al. | 331—11 |
| 2,925,590 | 2/1960 | Boltinghouse et al. | 340—200 |
| 2,968,031 | 1/1961 | Higa | 340—200 |
| 3,187,256 | 6/1965 | Foster | 340—200 X |

JOHN W. CALDWELL, *Acting Primary Examiner.*

DAVID G. REDINBAUGH, NEIL C. READ,
*Examiners.*

D. YUSKO, *Assistant Examiner.*